US012697763B2

(12) United States Patent
Kawano et al.

(10) Patent No.: US 12,697,763 B2
(45) Date of Patent: Aug. 4, 2026

(54) THREE-DIMENSIONAL NETWORK STRUCTURE AND MANUFACTURING METHOD THEREFOR

(71) Applicant: TOYOBO MC Corporation, Osaka (JP)

(72) Inventors: Fumika Kawano, Otsu (JP); Teruyuki Taninaka, Otsu (JP); Daisuke Sakura, Otsu (JP); Shinichi Kobuchi, Osaka (JP)

(73) Assignee: TOYOBO MC CORPORATION, Osaka (JP)

( * ) Notice: Subject to any disclaimer, the term of this patent is extended or adjusted under 35 U.S.C. 154(b) by 68 days.

(21) Appl. No.: 18/846,133

(22) PCT Filed: Mar. 30, 2023

(86) PCT No.: PCT/JP2023/013355
§ 371 (c)(1),
(2) Date: Sep. 11, 2024

(87) PCT Pub. No.: WO2023/190964
PCT Pub. Date: Oct. 5, 2023

(65) Prior Publication Data
US 2025/0178273 A1     Jun. 5, 2025

(30) Foreign Application Priority Data
Mar. 31, 2022     (JP) ................................. 2022-060477

(51) Int. Cl.
*B29C 48/05*     (2019.01)
*B29C 64/118*    (2017.01)
(Continued)

(52) U.S. Cl.
CPC ............ *B29C 48/05* (2019.02); *B29C 64/118* (2017.08); *D04H 3/011* (2013.01); *D04H 3/03* (2013.01);
(Continued)

(58) Field of Classification Search
CPC ......... B29C 48/05; B29C 64/118; D04H 3/03; D04H 3/011
See application file for complete search history.

(56) References Cited

U.S. PATENT DOCUMENTS 9,938,649 B2 *    4/2018    Taninaka ................. D04H 3/16
2013/0147087 A1    6/2013    Huang et al.
(Continued)

FOREIGN PATENT DOCUMENTS

CA        2148691 C      8/2003
JP        H07-238457 A    9/1995
(Continued)

OTHER PUBLICATIONS

International Search Report dated Jun. 20, 2023, issued in counterpart application No. PCT/JP2023/013355 with English translation. (5 pages).
(Continued)

*Primary Examiner* — Atul P. Khare
(74) *Attorney, Agent, or Firm* — WHDA, LLP

(57) ABSTRACT

It is provided that: a three-dimensional network structure that exhibits excellent cushioning property and excellent compression recoverability after thermal compression at a usage environmental temperature; and a manufacturing method therefor. A three-dimensional network structure having a three-dimensional random loop-bonded configuration and comprising a continuous filament made from a thermoplastic resin composition, wherein the thermoplastic resin composition contains 70% by mass or higher of a polybuty-
(Continued)

lene adipate terephthalate resin, and an enthalpy of an endothermic peak in which a DSC curve regarding the continuous filament measured by using a differential scanning calorimeter has a minimum value in a range from 30° C. to 70° C. of 2.5 J/g or lower.

9 Claims, 1 Drawing Sheet

(51) Int. Cl.

| | | |
|---|---|---|
| *D04H 3/011* | (2012.01) | |
| *D04H 3/03* | (2012.01) | |
| *B29K 67/00* | (2006.01) | |
| *B29L 31/00* | (2006.01) | |
| *B33Y 10/00* | (2015.01) | |
| *B33Y 40/20* | (2020.01) | |
| *B33Y 80/00* | (2015.01) | |

(52) U.S. Cl.
CPC ................... *B29K 2067/006* (2013.01); *B29K 2995/0012* (2013.01); *B29K 2995/006* (2013.01); *B29L 2031/751* (2013.01); *B33Y 10/00* (2014.12); *B33Y 40/20* (2020.01); *B33Y 80/00* (2014.12)

(56) References Cited

U.S. PATENT DOCUMENTS

| | | |
|---|---|---|
| 2014/0065914 A1 | 3/2014 | Wang et al. |
| 2018/0177306 A1 | 6/2018 | Kobuchi et al. |
| 2018/0282924 A1 | 10/2018 | Kobuchi et al. |
| 2024/0150945 A1 | 5/2024 | Taninaka et al. |

FOREIGN PATENT DOCUMENTS

| | | | |
|---|---|---|---|
| JP | H08-260324 A | | 10/1996 |
| JP | H08-336443 A | | 12/1996 |
| JP | 2000-328422 A | | 11/2000 |
| JP | 2001-032236 A | | 2/2001 |
| JP | 2017132076 A | * | 8/2017 |
| JP | 2017-186687 A | | 10/2017 |
| JP | 2020-128608 A | | 8/2020 |
| WO | 2022/209976 A1 | | 10/2022 |

OTHER PUBLICATIONS

Extended (Supplementary) European Search Report dated Mar. 2, 2026, issued in counterpart EP Application No. 23780972.8. (9 pages).
Office Action dated Mar. 17, 2026, issued in counterpart CN Application No. 202380024889.4, with English translation. (10 pages).
Office Action dated Jun. 16, 2026, issued in counterpart JP Application No. 2023-564073, with English translation.(5 pages).

* cited by examiner

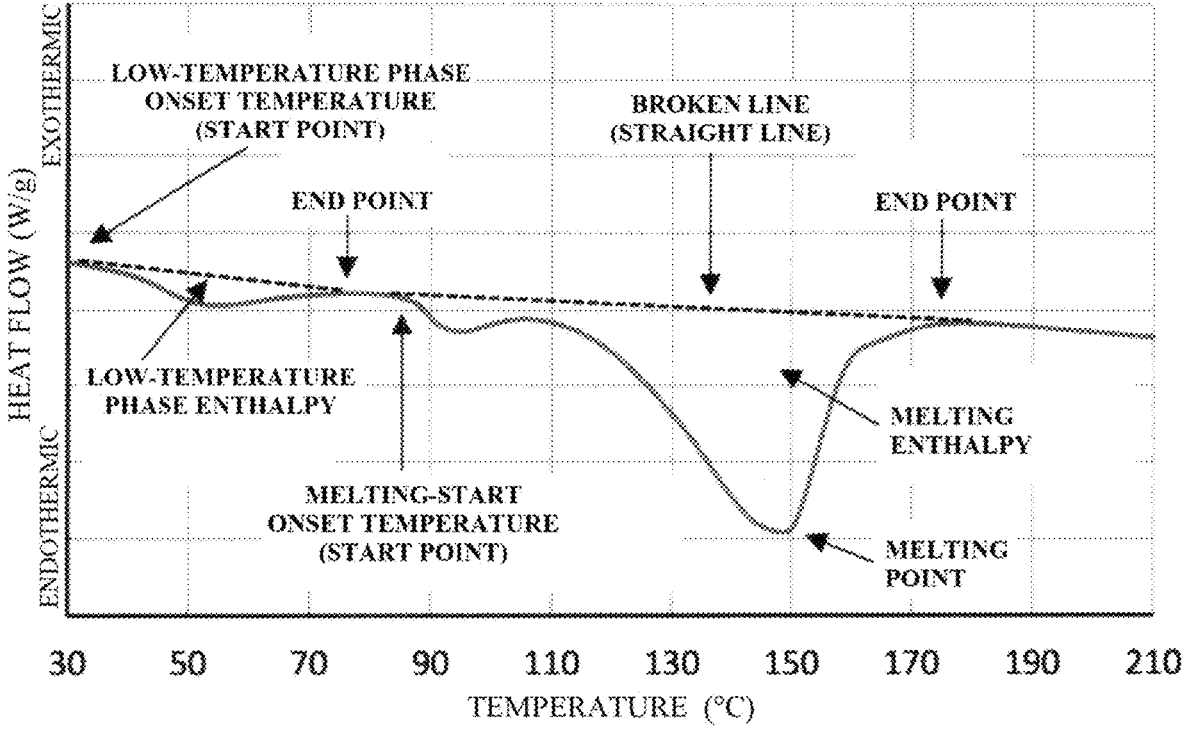

THREE-DIMENSIONAL NETWORK STRUCTURE AND MANUFACTURING METHOD THEREFOR

TECHNICAL FIELD

The present invention relates to a three-dimensional network structure and a manufacturing method therefor.

BACKGROUND ART

To date, three-dimensional network structures are widely used as cushioning materials utilized for furniture, beddings such as beds, seats for vehicles such as electric trains, automobiles, and two-wheeled vehicles from the viewpoint of excellent air permeability and recyclability. Environment-related issues have been addressed in an accelerated manner recently. In view of this acceleration, research on biodegradable polymers that degrade in a shorter time than conventional polymers has been progressing for these three-dimensional network structures as well. Consequently, various technologies regarding biodegradable three-dimensional network structures have been disclosed to date.

Patent Document 1 discloses a technology of improving plant retaining properties of a biodegradable network structure. In addition, Patent Document 2 discloses a technology of improving local joining of a fiber material of a biodegradable network structure. In addition, Patent Document 3 discloses a technology of forming a coil spring-shaped or loop-shaped portion in a biodegradable three-dimensional structure so as to allow the portion to be suitably deformed under a compressive stress so that the stress is dispersed.

CITATION LIST

Patent Literature

Patent Document 1: Japanese Laid-Open Patent Publication No. 2001-032236

Patent Document 2: Japanese Laid-Open Patent Publication No. 2020-128608

Patent Document 3: Japanese Laid-Open Patent Publication No. 2000-328422

SUMMARY OF THE INVENTION

Problems to be Solved by the Invention

In this manner, various attempts have been made to improve functions of biodegradable network structures to date. However, there has yet to be a known biodegradable three-dimensional network structure that exhibits both excellent cushioning property and excellent recoverability under heat compression at a usage environmental temperature at which the biodegradable three-dimensional network structure is used as a cushioning material. The present invention has been made in view of the above circumstances, and an object of the present invention is to provide: a biodegradable three-dimensional network structure that exhibits excellent cushioning property and excellent compression recoverability after thermal compression at a usage environmental temperature; and a manufacturing method therefor.

Solution to the Problems

The three-dimensional network structure of the present invention is as follows.

[1] A three-dimensional network structure having a three-dimensional random loop-bonded configuration and comprising a continuous filament made from a thermoplastic resin composition, wherein the thermoplastic resin composition contains 70% by mass or higher of a polybutylene adipate terephthalate resin, and an enthalpy of an endothermic peak in which a differential scanning calorimetry curve regarding the continuous filament measured by using a differential scanning calorimeter has a minimum value in a range from 30° C. to 70° C. of 2.5 J/g or lower.

[2] The three-dimensional network structure according to the above [1], wherein the polybutylene adipate terephthalate resin contains an adipic acid unit and a terephthalic acid unit, and a molar ratio of the terephthalic acid unit to the adipic acid unit is 1.0 or higher and 3.0 or lower.

[3] The three-dimensional network structure according to the above [1] or [2], wherein the polybutylene adipate terephthalate resin has a melting point of 120° C. or higher and 180° C. or lower.

[4] The three-dimensional network structure according to any one of the above [1] to [3], wherein the three-dimensional network structure has a 40° C. compressive residual strain of 25% or lower.

[5] The three-dimensional network structure according to any one of the above [1] to [4], wherein the three-dimensional network structure has a 40° C. compressive residual strain of 15% or lower and a 70° C. compressive residual strain of 30% or lower.

In addition, the manufacturing method of the three-dimensional network structure of the present invention is as follows.

[6] A method for manufacturing the three-dimensional network structure according to the above [1], the method comprising: an extrusion step of extruding, from a nozzle, the thermoplastic resin composition melted; a molding step of molding the continuous filament extruded from the nozzle, into a three-dimensional network configuration so as to obtain a molded body; and a heat treatment step of heat treating the molded body, wherein the heat treatment step includes two stages, a first stage of the heat treatment step includes heat treating the continuous filament at a temperature not higher than a melting point of the continuous filament, and a second stage of the heat treatment step includes heat treating the continuous filament at a temperature lower than the heat treatment temperature in the first stage of the heat treatment step.

[7] The method for manufacturing the three-dimensional network structure, according to the above [6], wherein the thermoplastic resin composition contains a polybutylene adipate terephthalate resin having a melting point of 120° C. or higher and 180° C. or lower.

Advantageous Effects of the Invention

In the present invention, the above configuration makes it possible to provide: a biodegradable three-dimensional network structure that exhibits excellent cushioning property and excellent compression recoverability after thermal compression at a usage environmental temperature; and a manufacturing method therefor.

BRIEF DESCRIPTION OF THE DRAWING

FIG. 1 shows an example of a differential scanning calorimetry curve regarding a continuous filament composing a three-dimensional network structure, the differential scanning calorimetry curve being for measuring an enthalpy of an endothermic peak in which the differential scanning calorimetry curve has a minimum value in a range from 30° C. to 70° C.

DESCRIPTION OF EMBODIMENTS

The three-dimensional network structure of the present invention is a three-dimensional network structure having a three-dimensional random loop-bonded configuration and comprising a continuous filament made from a thermoplastic resin composition, wherein the thermoplastic resin composition contains 70% by mass or higher of a polybutylene adipate terephthalate resin, and an enthalpy of an endothermic peak in which a differential scanning calorimetry curve (DSC curve) regarding the continuous filament measured by using a differential scanning calorimeter has a minimum value in a range from 30° C. to 70° C. is 2.5 J/g or lower.

The above configuration makes it possible to improve compression recoverability to be exhibited after thermal compression at a usage environmental temperature. The usage environmental temperature means a temperature at which the three-dimensional network structure of the present invention is used as a product such as a cushion. In general, the usage environmental temperature is room temperature. Meanwhile, the usage environmental temperature herein is 40° C. as a representative temperature, and a compressive residual strain at 40° C. is utilized as an index of the compression recoverability to be exhibited after thermal compression at the usage environmental temperature.

Hereinafter, each of components will be described in detail.

<Thermoplastic Resin Composition>

The thermoplastic resin composition forming the continuous filament contains 70% by mass or higher of a polybutylene adipate terephthalate resin. A polybutylene adipate terephthalate resin is selected from among biodegradable resins, and a thermoplastic resin composition containing 70% by mass or higher of the polybutylene adipate terephthalate resin is used, whereby a biodegradable three-dimensional network structure that exhibits excellent cushioning property can be obtained. The content of polybutylene adipate terephthalate resin in the thermoplastic resin composition is preferably 75% by mass or higher, more preferably 80% by mass or higher, further preferably 90% by mass or higher, and particularly preferably 95% by mass or higher. The thermoplastic resin composition forming the continuous filament may contain 100% by mass of the polybutylene adipate terephthalate resin.

The polybutylene adipate terephthalate resin is biodegradable and is a copolymer of adipic acid, terephthalic acid, and butanediol. Since the polybutylene adipate terephthalate resin has biodegradability, the polybutylene adipate terephthalate resin is expected to provide one solution to solve problems in waste disposal and microplastics. Adipic acid, terephthalic acid, and butanediol need not be copolymerized at the same time and may be copolymerized in multiple steps. The polybutylene adipate terephthalate resin is preferably a thermoplastic resin.

The molar ratio of the terephthalic acid unit to the adipic acid unit in the polybutylene adipate terephthalate resin is preferably 0.8 or higher and 3.0 or lower. The lower limit of the molar ratio is more preferably 1.0 or higher, further preferably 1.1 or higher, and particularly preferably 1.2 or higher. Meanwhile, the upper limit of the molar ratio is more preferably 2.5 or lower and further preferably 2.0 or lower. When the molar ratio is 0.8 or higher, it becomes easy for the three-dimensional network structure to exhibit an improved compression recoverability after heat compression at the usage environmental temperature. Meanwhile, when the molar ratio is 3.0 or lower, the three-dimensional network structure exhibits an improved flexibility, and thus, becomes suitable as a cushioning material or the like.

The polybutylene adipate terephthalate resin has a melting point of preferably 120° C. or higher and 180° C. or lower. The lower limit of the melting point is more preferably 125° C. or higher, further preferably 130° C. or higher, even more preferably 140° C. or higher, and particularly preferably 145° C. or higher. Meanwhile, the upper limit of the melting point is more preferably 170° C. or lower and further preferably 160° C. or lower. When the melting point is 120° C. or higher, it can be made easy for the three-dimensional network structure to exhibit an improved compression recoverability after heat compression at the usage environmental temperature. Meanwhile, when the melting point is 180° C. or lower, the three-dimensional network structure exhibits an improved flexibility, and thus, can be suitably used as a cushioning material or the like.

The polybutylene adipate terephthalate resin has a melt flow rate (MFR) of preferably from 3 g/10 min to 60 g/10 min. When the MFR is 3 g/10 min or more, the melt viscosity can be increased and thus the fiber diameter of the continuous filament can be increased. The lower limit of the continuous filament has MFR of more preferably 5 g/10 min or more, further preferably 12 g/10 min or more, further more preferably 15 g/10 min or more, and particularly preferably 18 g/10 min or more. Meanwhile, when the MFR is 60 g/10 min or less, it is easier to improve compression recoverability after heat compression. The upper limit of the continuous filament has MFR of more preferably 50 g/10 min or less, further preferably 40 g/10 min or less, and particularly preferably 30 g/10 min or less. The thermoplastic resin composition forming the continuous filament preferably has MFR within the above range. MFR of the continuous filament can be measured by a method described in Examples.

In case where a commercially available resin is used as a polybutylene adipate terephthalate resin, water may be added when the resin has a low melt flow rate (MFR). When using a commercially available resin as a polybutylene adipate terephthalate resin, in case where a resin has a low melt flow rate (MFR), MFR of the resin can be increased by adding water to the resin to cause hydrolysis of the resin during melt extrusion. Meanwhile, in case where a resin has a high MFR, MFR of the resin can be reduced by drying the resin and then melt extruding.

The polybutylene adipate terephthalate resin has a weight average molecular weight (g/mol) of preferably 35000 or more, thereby enabling improvement in compression recovery after heat compression. The weight average molecular weight is more preferably 37000 or more, and further preferably 40000 or more. Meanwhile, the weight average molecular weight is preferably 150000 or less, thereby enabling improvement in elasticity. The weight average molecular weight is more preferably 120000 or less. The thermoplastic resin composition forming the continuous filament preferably has a weight average molecular weight (g/mol) within the above range. The weight average molecular weight can be determined by a method such as gel permeation chromatography (GPC).

The thermoplastic resin composition forming the continuous filament may include another biodegradable resin other than polybutylene adipate terephthalate resin. The biodegradable resin other than polybutylene adipate terephthalate resin preferably include polylactic acid, polylactic acid/polycaprolactone copolymer, polylactic acid/polyether copolymer, polyethylene terephthalate succinate, polybutylene succinate, polybutylene succinate adipate, polyglycolic acid, polycaprolactone, polyvinyl alcohol, cellulose acetate, and the like. These resins may be used alone or in combination. Details of the resins are shown in the positive list of green plastic (biodegradable plastic) with a classification number A-1 published by Japan BioPlastics Association. The thermoplastic resin composition forming the continuous filament may include a resin other than biodegradable resin. Examples of the resin include thermoplastic resins such as polyolefin, polyurethane, and polyester.

The thermoplastic resin composition forming the continuous filament may contain additives such as a deodorant agent, an antibacterial agent, an antifungal agent, an anti-mite agent, an anti-odor agent, an antimycotic agent, an aromatic agent, a flame retardant, a moisture absorbing/releasing agent, an antioxidant, and a lubricant. These may be used alone or in combination.

In addition, the thermoplastic resin composition forming the continuous filament may contain not only the polybutylene adipate terephthalate resin but also a resin having other copolymerization components other than adipic acid, terephthalic acid, and butanediol as units. Examples of the other copolymerization component include any dicarboxylic acid other than adipic acid and terephthalic acid, any diol other than butanediol, polyalkylene glycol, and a modifier for chain extension or end capping. These may be used alone or in combination.

Examples of the dicarboxylic acid other than adipic acid and terephthalic acid include oxalic acid, malonic acid, succinic acid, glutaric acid, pimelic acid, and suberic acid. These may be used alone or in combination.

Examples of the diol other than butanediol include methanediol, ethanediol, propanediol, pentanediol, and hexanediol. Example of the polyalkylene glycol include polymethylene glycol, polyethylene glycol, polypropylene glycol, and polybutylene glycol (polytetramethylene glycol). These may be used alone or in combination.

The modifier may be, for example, a polyisocyanate compound or a glycol compound. The polyisocyanate compound may be, for example, a diisocyanate compound.

Examples of the diisocyanate compound include hexamethylene diisocyanate, 4,4'-diphenylmethane diisocyanate, 2,4-tolylene diisocyanate, 2,6-tolylene diisocyanate, xylylene diisocyanate, 1,5-naphthylene diisocyanate, p-phenylene diisocyanate, isophorone diisocyanate, 4,4'-dicyclohexylmethane diisocyanate, tetra-methyl xylene diisocyanate, carbodiimide modified MDI, and polymethylene phenyl polyisocyanate. These compounds may be used alone or in combination.

The thermoplastic resin composition forming the continuous filament may include a thermoplastic resin composition synthesized from petroleum-derived monomers. However, biomass-derived monomers are preferable from the viewpoint of lowering environmental load. As to the biomass-derived monomers, for example, monomers shown in a positive list with a classification number A (biomass-derived plastic) published by Japan BioPlastics Association can be used.

The total amount of the adipic acid unit and the terephthalic acid unit contained per 100 mol % of the dicarbon units contained in the thermoplastic resin composition forming the continuous filament is preferably 70 mol % or higher, more preferably 80 mol % or higher, further preferably 90 mol % or higher, even more preferably 95 mol % or higher, and particularly preferably 99 mol % or higher. The amount of the butanediol unit contained per 100 mol % of the diol units contained in the thermoplastic resin composition forming the continuous filament is preferably 70 mol % or higher, more preferably 80 mol % or higher, further preferably 90 mol % or higher, even more preferably 95 mol % or higher, and particularly preferably 99 mol % or higher.

<Continuous Filament>

The three-dimensional network structure of the present invention comprises a continuous filament made from a thermoplastic resin composition and has a three-dimensional random loop-bonded configuration. The continuous filament is a linear filament having continuous portion of at least 5 mm or more. The intersection portions of continuous linear filaments are bonded with each other, thereby enabling the formation of the three-dimensional network structure easier. Therefore, the three-dimensional network structure preferably has bonding portions where the intersection portions of the continuous linear filaments are bonded with each other.

The continuous filament may include a complex filament of a sheath-core type, a side-by-side type, or an eccentric sheath-core type. The complex filament may be a complex filament including polybutylene adipate terephthalate resin in combination with another thermoplastic resin. Although the filament may have either a hollow or a solid cross section, a hollow cross section is preferable from the viewpoint of weight reduction. In addition, the filament may preferably have a modified cross section. Such a shape of cross section makes it easier for the three-dimensional network structure to have an appropriate hardness and cushioning property. The lower limit of the hollow rate of the filament is preferably 1% or more, more preferably 2% or more, particularly preferably 5% or more. Meanwhile, the upper limit of the hollow rate of the filament is preferably 30% or less, more preferably 25% or less, and particularly preferably 20% or less. The hollow rate of the filament can be measured by a method described in Examples The continuous filament has an average fiber diameter of preferably from 0.2 mm to 2.0 mm. When the average fiber diameter is 0.2 mm or more, the hardness is improved. Therefore, the average fiber diameter is more preferably 0.3 mm or more, and further preferably 0.4 mm or more. Meanwhile, the average fiber diameter of 2.0 mm or less improves fineness of the network structure and thus enhances cushioning property, and also make it easier for the network structure to have soften feel. Therefore, the average fiber diameter is more preferably 1.7 mm or less, further preferably 1.5 mm or less, and particularly preferably 1.2 mm or less. The average fiber diameter of the continuous filament can be measured by a method described in Examples.

The continuous filament has a melting enthalpy of preferably 16 J/g or higher. The melting enthalpy of 16 J/g or higher enables improvement in compression durability and compression recovery after heat compression of the three-dimensional network structure. The melting enthalpy is more preferably 17 J/g or higher, further preferably 18 J/g or higher, further more preferably 19 J/g or higher, even more preferably 20 J/g or higher, and particularly preferably 21 J/g or higher. Meanwhile, the melting enthalpy is preferably 30 J/g or lower, and such a melting enthalpy can improve flexibility of the three-dimensional network structure and thus can reduce noise during compression and recovery from compression. The melting enthalpy is more preferably 28 J/g or lower, and further preferably 26 J/g or lower.

The enthalpy (J/g) of the endothermic peak of the continuous filament can be determined from the integration value calculated from the endothermic peak (melting peak) of a DSC curve obtained by measuring a sample weighed to mass of 2.0 mg±0.1 mg at a temperature rise rate of 20° C./min under a nitrogen atmosphere with a differential scanning calorimeter. The integration value can be obtained by determining a start point at which the DSC curve with the endothermic peak (melting peak) began to leave from a baseline of a low temperature side and an end point at which the curve began to contact with a baseline of a high temperature side, drawing a straight line connecting the start and end points, and integrating the area enclosed by the line and the curve. FIG. 1 shows an exemplary DSC curve. In FIG. 1, the dashed line is drawn by connecting the start and end points of the endothermic peak (melting peak), and the area enclosed by the dashed line and the curve will be integrated.

An enthalpy of an endothermic peak in which the DSC curve, regarding the continuous filament composing the three-dimensional network structure, measured by using a differential scanning calorimeter has a minimum value in a range from 30° C. to 70° C., is 2.5 J/g or lower. The "enthalpy of the endothermic peak in which the DSC curve has a minimum value in the range from 30° C. to 70° C." is sometimes expressed as a low temperature phase enthalpy in the present invention. Since the enthalpy of the endothermic peak is 2.5 J/g or lower, the compressive residual strain at 40° C. is decreased. As a result, the extent of irrecoverable deformation that might be perceived when the three-dimensional network structure is used as a cushioning material, can be decreased. Considering this advantage, the enthalpy of the endothermic peak is preferably 1.5 J/g or lower and more preferably 1.0 J/g or lower. The lower limit of the enthalpy of the endothermic peak is not particularly limited, and the enthalpy of the endothermic peak is, for example, 0.2 J/g or higher in consideration of technical difficulties.

<Three-Dimensional Network Structure>

The three-dimensional network structure may include a multilayered structure. The multilayered structure may be (i) a structure having top and back surface layers, each surface layer including a continuous filament having different finesse, (ii) a structure having top and back surface layers, each surface layer having different apparent density, or (iii) a structure including laminated long and/or short fiber nonwoven fabric. Examples of the method for forming the multilayered structure include a method for fusing and fixing the layers by heating, a method for bonding the layers with an adhesive, and a method for binding the layers by sewing or using a band.

The shape of the three-dimensional network structure is not particularly limited. Examples of the shape of the three-dimensional network structure include a plate, triangular, quadrangular such as polygonal, cylindrical, spherical shape, or combinations thereof. The three-dimensional network structure may be obtained by molding with baffles when resin is melt extruded, or may be molded by a method such as cutting or hot pressing.

The three-dimensional network structure has an apparent density of preferably from 0.005 g/cm³ to 0.30 g/cm³. The apparent density of 0.005 g/cm³ or more leads to an increase in hardness of the three-dimensional network structure, resulting in a reduction in bottom touching feeling of the three-dimensional network structure when applied to a cushion. Therefore, the lower limit of the three-dimensional network structure has an apparent density of more preferably 0.01 g/cm³ or more, further preferably 0.02 g/cm³ or more, particularly preferably 0.03 g/cm³ or more, and most preferably 0.05 g/cm³ or more.

Meanwhile, the apparent density of 0.30 g/cm³ or less leads to improvement in flexibility, thereby allowing the three-dimensional network structure to be suitably applied as cushioning material. Therefore, the upper limit of the apparent density is more preferably 0.20 g/cm³ or less, and further preferably 0.15 g/cm³ or less. The apparent density of the three-dimensional network structure can be measured by a method described in Examples.

The three-dimensional network structure has a thickness of preferably from 10 mm to 120 mm. The thickness of 10 mm or more make it easier for the three-dimensional network structure to be applied as cushioning material. Therefore, the lower limit of the thickness is more preferably 15 mm or more, further preferably 20 mm or more, and particularly preferably 22 mm or more. Considering the size of the manufacturing equipment, the upper limit of the thickness is more preferably 100 mm or less, further preferably 80 mm or less, and particularly preferably 50 mm or less. The thickness of the three-dimensional network structure can be measured by a method described in Examples.

The three-dimensional network structure has a 40° C. compressive residual strain of preferably 25% or lower, thereby enabling improvement in compression recovery after heat compression. The upper limit of the 40° C. compressive residual strain is more preferably 20% or lower, further preferably 17.5% or lower, and particularly preferably 15% or lower. The 40° C. compressive residual strain may be 1% or higher, or 5% or higher. The 40° C. compressive residual strain can be measured by a method described in Examples.

The three-dimensional network structure has a 70° C. compressive residual strain of preferably 30% or lower, thereby enabling improvement in compression recovery after heat compression. The upper limit of the 70° C. compressive residual strain is more preferably 25% or lower, and further preferably 23% or lower. The 70° C. compressive residual strain may be 1% or higher, or 5% or higher. The 70° C. compressive residual strain can be measured by a method described in Examples.

The three-dimensional network structure has preferably a 40° C. compressive residual strain of 15% or lower and a 70° C. compressive residual strain of 30% or lower. This can be improved the compression recoverability to be exhibited after heat compression at the usage environmental temperature and at a high temperature environment. The upper limit of the 40° C. compressive residual strain is more preferably 13% or lower. Meanwhile, the upper limit of the 70° C. compressive residual strain is more preferably 27% or lower, and further preferably 25% or lower.

The three-dimensional network structure has a hardness (hereinafter referred to as "25% compression hardness") of the three-dimensional network structure when compressed 25% in the thickness direction (when compressed to 75% thickness) of preferably 5.0 N/φ50 mm or more and 100 N/φ50 mm or less. The 25% compression hardness of 5.0 N/φ50 mm or more can reduce the bottom touching feeling of the three-dimensional network structure when applied to a cushion. Therefore, the lower limit of the 25% compression hardness is more preferably 5.4 N/φ50 mm or more, further preferably 6.0 N/φ50 mm or more, and particularly preferably 7.0 N/φ50 mm or more. Meanwhile, the 25% compression hardness of 100 N/φ50 mm or less can enhance cushioning property. Therefore, the upper limit of the 25% compression hardness is more preferably 80 N/φ550 mm or less, further preferably 60 N/φ50 mm or less, and particularly preferably 30 N/φ550 mm or less. The 25% compression hardness can be measured by a method described in Examples.

The three-dimensional network structure has a melting point of preferably 120° C. or higher and 180° C. or lower. Regarding the lower limit of the melting point, the melting point is more preferably 125° C. or higher, further preferably 130° C. or higher, even more preferably 140° C. or higher, and particularly preferably 145° C. or higher. Meanwhile, regarding the upper limit of the melting point, the melting point is more preferably 170° C. or lower and further preferably 160° C. or lower. When the melting point is 120° C. or higher, it can be made easy for the three-dimensional network structure to exhibit an improved compression recoverability after heat compression at the usage environmental temperature. Meanwhile, when the melting point is 180° C. or lower, the three-dimensional network structure exhibits an improved flexibility, and thus, can be suitably used as a cushioning material or the like.

The three-dimensional network structure is preferably free from a bonding promoter. The absence of a bonding promoter prevents excessive hardening generated by excessive bonding due to bonding promoter in the three-dimensional network structure. In addition, a decrease in fineness of the three-dimensional network structure caused by excessively increased bonding area per one bonding point may be prevented. Examples of the bonding promoter include polycaprolactone, polybutylene succinate, polybutylene sebacate terephthalate, and polybutylene azelate terephthalate.

The three-dimensional network structure may be colored. A color agent such as a pigment or a dye can be used. The color agent may be contained in the resin before melt spinning, or the continuous filaments may be coated with a color agent by immersion or application after the formation of the three-dimensional network structure.

The three-dimensional network structure of the present invention is preferably applied to a cushion. The cushion may be resilient enough to support objects or may be able to reduce impact. Examples of the cushion include cushions for office chairs, furniture, sofas, bedding such as beds, cushions for seats of vehicles such as trains, automobiles, two-wheeled vehicles, child safety seats, and baby buggies, shock-absorbing mats such as floor mats and members for preventing collision and nipping.

<Manufacturing Method for Three-Dimensional Network Structure>

A manufacturing method for the three-dimensional network structure preferably includes: an extrusion step of extruding, from a nozzle, the thermoplastic resin composition melted; a molding step of molding the continuous filament made from the thermoplastic resin composition extruded from the nozzle, into a three-dimensional network configuration so as to obtain a molded body; and a heat treatment step of heat treating the molded body. A three-dimensional network structure for which the heat treatment step has not been finished is referred to as a molded body in order to avoid confusion with a three-dimensional network structure as a finished product (a three-dimensional network structure for which the heat treatment step has been finished). The extrusion step and the molding step are not particularly limited as long as these steps are performed through a publicly known manufacturing method. Specific examples of the manufacturing method include the following method.

The thermoplastic resin composition including polybutylene adipate terephthalate resin is distributed from a multi-row nozzle having a plurality of orifices to another nozzle having orifices, and then discharged downward from the nozzle at a spinning temperature, which is melting point of the resin +20° C. or higher and lower than melting point of the resin +180° C. Next, a three-dimensional network structure is formed by bringing continuous filaments into contact with each other in a melt state and fusing contact portions thereof, then the structure is sandwiched with take-up conveyors, and cooled with a cooling water in a water tank. After cooling, the solidified molded body is drawn, then drained or dried, and the molded body having two or one smoothed side can be obtained. With regard to the spinning process and the cooling process, for example, descriptions in Japanese Laid-Open Patent Publication No. H7-68061 can be referenced. In case where only one surface needs to be smoothed, continuous filaments are discharged on an inclined take-up net, and the continuous filaments are contacted with each other and fused at contact portions thereof in a melt state. While the three-dimensional network structure is being formed, the shape only on the take-up net touching side of the structure may be loosened and the structure may be cooled. The obtained molded body may be subjected to a heat treatment. The drying treatment of the molded body may be the heat treatment.

Water may be added to the thermoplastic resin composition before the resin is discharged from a nozzle. Adding water to the thermoplastic resin composition allows promoted degradation of the thermoplastic resin composition in the production process of the three-dimensional network structure or improvement in flexibility of the resin. In addition, water is added preferably at 2.0% by mass or less with respect to the thermoplastic resin composition, thereby enabling prevention of excessive degradation of the thermoplastic resin composition in the production process of the three-dimensional network structure and thus facilitating improvement in compression recovery after heat compression. Water may be added to the thermoplastic resin composition in any manner. For example, the thermoplastic resin composition may be absolutely dried in vacuum at 100° C. for 12 hours or more before discharged from a nozzle, and a predetermined amount of water may be added with respect to 100% by mass of absolutely dried thermoplastic resin composition.

After melt-molding, the polybutylene adipate terephthalate resin is cooled preferably with cooling water. The polybutylene adipate terephthalate resin may shrink in molding by the time the resin is solidified by cooling. Because of the molding shrinkage phenomenon, the three-dimensional network structure should preferably be formed to have a width and a thickness in consideration of molding shrinkage. For example, by lowering the solidification temperature of melting resin, the shrinkage in molding can be reduced. Therefore, the temperature of the cooling water in the water tank is preferably 20° C. or lower, more preferably 15° C. or lower, and particularly preferably 10° C. or lower. The resin is preferably cooled with cooling water with the cooling time of preferably 30 seconds or more. The resin is preferably solidified by cooling in a water tank.

The heat treatment may be conducted in a commercially available hot-air drying oven or may be in a warm water bath. The heat treatment temperature is preferably 50° C. or higher. The heat treatment under such conditions can increase a melting enthalpy. The heat treatment temperature is more preferably 60° C. or higher, and further preferably 70° C. or higher. The heat treatment may be performed multiple times at different temperatures.

In the heat treatment, one stage of heat treatment or two stages of heat treatment may be performed. The two stages of heat treatment may include, for example: performing heat treatment (hereinafter, sometimes referred to as a first stage of heat treatment) at a temperature not higher than the melting point of the thermoplastic resin composition forming the continuous filament; and performing subsequent heat treatment (hereinafter, sometimes referred to as a second stage of heat treatment) at a temperature lower than the temperature of the aforementioned heat treatment.

The heat treatment temperature in the first stage of the heat treatment step is lower than the melting point of the thermoplastic resin composition by preferably 20° C. or higher, more preferably 25° C. or higher, and further preferably 30° C. or higher.

The heat treatment temperature in the second stage of the heat treatment step is lower than the heat treatment temperature in the first stage of the heat treatment step by preferably 15° C. or higher and more preferably 20° C. or higher. Consequently, the compression recoverability to be exhibited after heat compression at the usage environmental temperature and in a high temperature environment can be improved.

In particular, in the case of using a polybutylene adipate terephthalate resin in which the molar ratio of the terephthalic acid unit to the adipic acid unit is 0.8 or higher and lower than 1.0, the two stages of heat treatment are preferably performed. A crystal configuration that influences the low temperature phase enthalpy is relatively easily formed in the polybutylene adipate terephthalate resin in which the molar ratio of the terephthalic acid unit to the adipic acid unit is 0.8 or higher and lower than 1.0. Considering this influence, the two stages of heat treatment are performed, whereby the crystal configuration that influences the low temperature phase enthalpy can be decreased, and the low temperature phase enthalpy can be decreased.

For performing the heat treatment, the thermoplastic resin composition forming the continuous filament preferably has a melting point of 120° C. or higher and 180° C. or lower. The lower limit of the melting point is more preferably 125° C. or higher, further preferably 130° C. or higher, even more preferably 140° C. or higher, and particularly preferably 145° C. or higher. Meanwhile, the upper limit of the melting point is more preferably 170° C. or lower and further preferably 160° C. or lower. When the melting point is 120° C. or higher, the heat treatment can be performed in a suitable temperature range. Meanwhile, when the melting point is 180° C. or lower, the three-dimensional network structure exhibits an improved flexibility, and thus, can be suitably used as a cushioning material or the like.

The heat treatment time in each heat treatment step (only one stage of heat treatment step, the first stage of the heat treatment step, the second stage of the heat treatment step) is preferably 1 minute or more. This can increase melting enthalpy. The heat treatment time is more preferably 5 minutes or more, further preferably 10 minutes or more, and particularly preferably 15 minutes or more. Meanwhile, the upper limit of the heat treatment time in each heat treatment step is preferably 60 minutes or less, and more preferably 50 minutes or less. This can reduce yellowing, odor, and molecular weight loss of polybutylene adipate terephthalate resin due to polymer degradation and degradation in the heat treatment step. Further, productivity can be also improved.

The two stages of the heat treatment step may be continuously performed in a divided hot air oven or may be performed in a batch style at an interval of a unit of time which is several hours or several days. For example, the heat treatment may be performed by using a continuous type dryer, or a batch type drying oven may be used to perform the first stage of the heat treatment step, cool the molded body back to room temperature, and then perform the second stage of the heat treatment step.

The molded body solidified by cooling in the water tank is preferably kept under given temperature in the range of 20° C. to 50° C. for 1 minute or more (preferably 10 minute or more, more preferably 30 minute or more) before heat treatment. In heat treatment, the thickness of the molded body may change in some cases due to its own weight, however, the change in thickness of the molded body can be reduced by keeping the molded body in the range of 20° C. to 50° C. after solidification by cooling. For example, after solidification by cooling in a water tank, the molded body may be dried with a continuous dryer which has a first area of a hot air oven to keep the molded body at relative low temperature and a subsequent area of the hot air oven to heat treatment the molded body at relative high temperature.

Additives that can impart functions such as a deodorant and antibacterial property, an antifungal property, an anti-mite property, an anti-odor property, an aromatic property, a flame-retardant property, and a moisture absorbing/releasing property may be added to the thermoplastic resin in any step from the production step of the thermoplastic resin used as a raw material for three-dimensional network structure to the molding step of the three-dimensional network structure. In manufacturing the three-dimensional network structure, functional additives such as an antioxidant and a lubricant may be added to the polybutylene adipate terephthalate resin as a raw material. The functional additives may be used alone or in combination. Depending on the color tone and quality of the resin after being melted, it is preferable to mix various functional additives into a resin during melt extrusion to adjust the content of the functional additives.

Examples of the antioxidant include known phenol-based antioxidant, phosphite-based antioxidant, thioether-based antioxidant, benzotriazole-based UV absorber, triazine-based UV absorber, benzophenone-based UV absorber, N—H type hindered amine-based light stabilizer, and N—CH$_3$ type hindered amine-based light stabilizer. Among the above antioxidants, at least one antioxidant is preferably contained in the thermoplastic resin.

Examples of the phenol-based antioxidant include 1,3,5-tris[[3,5-bis(1,1-dimethylethyl)-4-hydroxyphenyl]methyl]-1,3,5-triazine-2,4,6(1H,3H,5H)-trione, 1,1,3-tris(2-methyl-4-hydroxy-5-tert-butylphenyl)butane, 4,4'-butylidenebis(6-tert-butyl-m-cresol), 3-(3,5-di-tert-butyl-4-hydroxyphenyl) propionic acid stearyl, pentaerythritol tetrakis[3-(3,5-di-tert-butyl-4-hydroxyphenyl)propionate], Sumilizer AG 80, and 2,4,6-tris(3',5'-di-tert-butyl-4'-hydroxybenzyl)mesitylene.

Examples of the phosphite-based antioxidant include 3,9-bis(octadecyloxy)-2,4,8,10-tetraoxa-3,9-diphosphaspiro[5, 5]undecane, 3,9-bis(2,6-di-tert-butyl-4-methylphenoxy-2,4, 8,10-tetraoxa-3,9-diphosphaspiro[5,5]undecane, 2,4,8,10-tetrakis(1,1-dimethylethyl)-6-[(2-ethylhexyl)oxy]-12H-dibenzo[d,g][1,3,2]dioxaphosphocin, tris(2,4-di-tert-butylphenyl)phosphite, tris(4-nonylphenyl)phosphite, 4,4'-isopropylidenediphenol C12-15 alcohol phosphite, diphenyl (2-ethylhexyl)phosphite, diphenyl isodecyl phosphite, triisodecyl phosphite, and triphenyl phosphite.

Examples of the thioether-based antioxidant include bis [3-(dodecylthio) propionate]2,2-bis[[3-(dodecylthio)-1-oxo-propyloxy]methyl]-1,3-propanediyl and 3,3'-ditridecyl thio-bispropionate.

In order to prevent thermal degradation of the thermoplastic resin, a mixture of phenol-based antioxidant and a phosphite-based antioxidant may be used. When these two types of antioxidants are used, the total content of these two types of antioxidants is preferably 0.05% by mass or more and 1.0% by mass or less with respect to 100% by mass of the thermoplastic resin composition.

Examples of the lubricant include hydrocarbon-based waxes, higher alcohol-based waxes, amide-based waxes, ester-based waxes, and metal soap. The lubricant is added, if needed, at 0.5% by mass or less with respect to 100% by mass of the thermoplastic resin composition on a mass basis.

The present application claims benefit of priority to Japanese Patent Application No. 2022-060477 filed on Mar. 31, 2022. The entire contents of the specification of Japanese Patent Application No. 2022-060477 filed on Mar. 31, 2022 are incorporated herein by reference.

EXAMPLES

Hereinafter, the present invention will be specifically described with Examples. However, the scope of the present invention is not limited by the following Examples. The present invention can be carried out with modifications within a range conforming to the gist described above and/or below, and all of which are included in the technical scope of the present invention.

The characteristic values of the three-dimensional network structure in Examples 1 to 7 and Comparative Examples 1 to 4 were measured by the following methods. The sample size described below was the standard size for the measurement, however, samples in available size was alternatively used in case of insufficiency in sample size.

(1) Average Fiber Diameter

The three-dimensional network structure was cut into a planar size of 10 cm×10 cm, and a continuous filament was collected at the length of about 5 mm from each of ten points of the cut three-dimensional network structure. The diameters of the collected continuous filaments were measured with an optical microscope by focusing on the measurement site of the fibers, and the average of the fiber diameters from the ten points was determined (n=10).

(2) Hollow Rate

From the three-dimensional network structure, ten continuous filaments were randomly collected. Each of the continuous filaments was then cut into a round-slicing direction and placed on cover glass in a standing state along the fiber axis. The cross section of the fiber was observed by an optical microscope. For the observation, only continuous filaments each having a hollow cross section were selected. With regard to the selected continuous filaments, the area within the perimeter line (a) and the area of hollow region part (b) of each fiber were calculated, then the hollow rate was calculated based on the following formula, and the average of the hollow rate of the selected continuous filaments having a hollow cross section was obtained (n=10).

$$\text{Hollow rate (\%)} = (b)/(a) \times 100$$

(3) Thickness and Apparent Density

The three-dimensional network structure was cut into the size of 10 cm×10 cm in the longitudinal and transverse directions, and the obtained sample was left standing for 24 hours with no load. After that, a height of the sample was determined by measuring the sample at one center point with a thickness gauge (model: FD-80N, manufactured by Kobunshi Keiki Co., Ltd.), and the height was determined as a thickness of the three-dimensional network structure. Further, the sample was weighed with an electronic balance. The volume of the sample was calculated by multiplying the height and the area of the sample (multiplication of vertical and horizontal length, 100 cm$^2$), and the apparent density was then determined by dividing the weight of the sample by the volume. The above operation was performed 3 times, and the average of the thickness and the apparent density of the three-dimensional network structure was obtained (n=3).

(4) Molar Ratio of Terephthalic Acid Unit to Adipic Acid Unit of Polybutylene Adipate Terephthalate Resin The molar ratio of the terephthalic acid unit to the adipic acid unit of each of polybutylene adipate terephthalate resins was measured through $^1$H-NMR at a resonance frequency of 600 MHz. The NMR device AVANCE-NEO 600 manufactured by Bruker Corporation was used as a measurement device, and measurement was performed as follows.

10 to 15 mg of a sample was dissolved in a solvent in which the volume ratio of deuterated chloroform to trifluoroacetic acid was 85/15. Then, an NMR tube was filled with the resultant solution, and measurement was performed. Deuterated chloroform was used as a lock solvent, the standby time was set to 1 second, the data acquisition time was set to 4 seconds, and the number of times of integration was set to 64 times.

When the peak of chloroform is set to 7.28 ppm, the peak of adipic acid is detected at 2.45 ppm, and the peak of terephthalic acid is detected at 8.15 ppm.

When the peak integral value of adipic acid is represented by A and the integral value of terephthalic acid is represented by B, the molar ratio of the terephthalic acid unit to the adipic acid unit of the polybutylene adipate terephthalate resin can be expressed by the following formula.

$$\text{Molar ratio} = ((B/4)/(A/4))$$

(5) Melting Point (Tm)

A sample was collected from the three-dimensional network structure and weighed out such that the mass of the sample was 2.0 mg±0.1 mg. Then, measurement was performed by using a differential scanning calorimeter (Discovery DSC25 manufactured by TA Instruments Corporation) under a condition of a nitrogen atmosphere at a temperature increase rate of 20° C./min, to obtain a DSC curve. From the DSC curve, a temperature in an endothermic peak (melting peak) was obtained. The above operation was performed 3 times, and the average value of the melting points was obtained (n=3).

(6) Melting Enthalpy

A sample was collected from each of the three-dimensional network structures and weighed out such that the mass of the sample was 2.0 mg±0.1 mg. Then, measurement was performed by using the differential scanning calorimeter (Discovery DSC25 manufactured by TA Instruments Corporation) under a condition of a nitrogen atmosphere at a temperature increase rate of 20° C./min, to obtain a DSC curve. From the DSC curve, an integral value of an endothermic peak (melting peak) was obtained, thereby evaluating a melting enthalpy (J/g).

The integral value of the endothermic peak (melting peak) was obtained as follows. That is, a point at which a curve related to the endothermic peak (melting peak) started to be away from the low temperature side of a baseline was defined as a start point, a point at which the curve started to be in contact with the high temperature side of the baseline was defined as an end point, a straight line connecting the start point and the end point was drawn, and a region enclosed by the straight line and the curve was integrated to obtain the melting enthalpy. The above operation was performed 3 times, and the average value of the melting enthalpies was obtained (n=3). The above start point was regarded as a melting-start onset temperature (° C.)

(7) Low Temperature Phase Enthalpy

In the DSC curve in the above item (6), an enthalpy of an endothermic peak in which the DSC curve had a minimum value in the range from 30° C. to 70° C. was obtained, and this enthalpy was defined as a low temperature phase enthalpy. An integral value of the endothermic peak in the low temperature phase region was obtained as follows. That is, a point at which a curve related to the endothermic peak started to be away from the low temperature side of a baseline was defined as a start point, a point at which the curve started to be in contact with the high temperature side of the baseline was defined as an end point, a straight line connecting the start point and the end point was drawn, and a region enclosed by the straight line and the curve in the range from 30° C. to 70° C. was integrated to obtain the low temperature phase enthalpy. The above operation was performed 3 times, and the average value of the low temperature phase enthalpies was obtained (n=3). The above start point was regarded as a low temperature phase onset temperature (° C.). An example of the experiment data is shown in FIG. 1.

(8) Melt Flow Rate (MFR)

The polybutylene adipate terephthalate resin was dried in a vacuum at 80° C. for 2 hours or more. Then, a melt flow rate (MFR) was quickly measured such that absorption of water in air was prevented as much as possible. The melt flow measurement was performed according to ISO 1133 by using the Melt Indexer F-F01 manufactured by Toyo Seiki Seisaku-sho, Ltd. The measurement temperature was set to 190° C., and the load was set to 2.16 kg. The above operation was performed 3 times, and the average value of the melt flow rates was obtained (n=3).

(9) Weight Average Molecular Weight

A sample was collected from the three-dimensional network structure and weighed out such that the mass of the sample was 0.2 mg. The sample was dissolved in 0.4 ml chloroform, to prepare a sample solution. The sample solution was filtered through a 0.2 μm membrane filter, GPC analysis was performed on the obtained sample solution under the following conditions, and a weight average molecular weight was calculated through standard polystyrene conversion.

Apparatus: TOSOH HLC-8320GPC
  Column: TSKgel SuperHM-H×2+TSKgel SuperH2000 (TOSOH)
  Solvent: chloroform
  Flow velocity: 0.6 ml/min
  Concentration: 0.05%
  Injection volume: 20 μL
  Temperature: 40° C.
  Detector: RI

(10) 40° C. Compressive Residual Strain

The three-dimensional network structure was cut into the planar size of 10 cm×10 cm. Thereafter, the thickness (c) of the sample before treatment was measured by the method described in the above (3). Then, the sample after the measurement was sandwiched in a tool capable of holding the sample in a 50% compression state, placed in a dryer controlled at 40° C., and left standing for 22 hours. After that, the sample was taken out from the dryer and cooled, compression strain of the sample was removed, and the thickness (d) of the sample after 30 minutes of left standing was measured. These values of thickness were applied to the following formula to determine a 40° C. compressive residual strain. The above operation was performed 3 times, and the average of the 40° C. compressive residual strain was obtained (n=3).

$$40° \text{ C. compressive residual strain} = \{(c) - (d)\}/(c) \times 100$$

(11) 70° C. Compressive Residual Strain

The three-dimensional network structure was cut into the planar size of 10 cm×10 cm. Thereafter, the thickness (c) of the sample before treatment was measured by the method described in the above (3). Then, the sample after the measurement was sandwiched in a tool capable of holding the sample in a 50% compression state, placed in a dryer controlled at 70° C., and left standing for 22 hours. After that, the sample was taken out from the dryer and cooled, compression strain of the sample was removed, and the thickness (e) of the sample after 30 minutes of left standing was measured. These values of thickness were applied to the following formula to determine a 70° C. compressive residual strain. The above operation was performed 3 times, and the average of the 70° C. compressive residual strain was obtained (n=3).

$$70° \text{ C. compressive residual strain} = \{(c) - (e)\}/(c) \times 100$$

(12) 25% Compression Hardness

The three-dimensional network structure was cut into the planar size of 10 cm×10 cm, and the obtained sample was left standing for 24 hours with no load in an environment of 23° C.±2° C. Subsequently, 25% compression hardness was measured in an environment of 23° C.±2° C. with Autograph (model: AG-X plus, manufactured by Shimadzu Corporation) in accordance with the method E of ISO 2439:2008. Specifically, a compression board having a diameter (φ) of 50 mm was placed at the center position of the sample, and a thickness at a load of 0.5 N was measured and defined as an initial thickness. The position of the compression board at this time was defined as a zero position. The sample was preliminary compressed to 75% of the initial thickness at a speed of 100 mm/min once, then the compression board was returned to the zero position at the same speed, and the sample was left standing for 4 minutes in that state. After that, the sample was immediately compressed to 25% of the initial thickness at a speed of 100 mm/min, and the load at this time was measured. The measured load was determined as a 25% compression hardness (N/φ50 mm). The above operation was performed 3 times, and the average of the 25% compression hardness was obtained (n=3).

The polybutylene adipate terephthalate resins were synthesized through the following methods.

<Resin A>

In a reaction tank equipped with a stirrer, a thermometer, and a distillation cooler, 1,4-butanediol, adipic acid, and dimethyl terephthalate were mixed in proportions of 1.5 moles, 0.5 moles, and 0.5 moles, respectively. Then, the resultant mixture was fed with 300 ppm of tetrabutyl titanate (manufactured by Sigma-Aldrich Co., LLC.) as a titanium-based catalyst. Thereafter, a transesterification reaction and an esterification reaction were performed for 2 hours under a normal pressure and at 220° C., to prepare a prepolymer. The prepolymer was heated to 240° C., and then subjected to a polycondensation reaction at 0.1 mmHg for 2 hours. The obtained resin A was cooled, and then cut by using a pellet cutter, to produce pellets.

<Resin B>

A resin B was produced in the same method as that for the resin A except that, unlike in the production of the resin A, the amounts of the adipic acid and the dimethyl terephthalate were changed to 0.40 moles and 0.60 moles, respectively. The obtained resin B was cooled, and then cut by using a pellet cutter, to produce pellets.

<Resin C>

A polymer C was produced in the same method as that for the resin A except that, unlike in the production of the resin A, the amounts of the adipic acid and the dimethyl tereph-thalate were changed to 0.53 moles and 0.47 moles, respectively. The obtained resin C was cooled, and then cut by using a pellet cutter, to produce pellets.

Example 1

The resin A was used as a raw material and extruded as melted resin downward of a nozzle at a spinning temperature of 220° C. and at a single-hole extrusion rate of 1.5 g/min. The nozzle had a nozzle effective surface that was 96 mm long in the width direction and that was 31 mm long in the thickness direction. On the nozzle effective surface, orifices each having an outer diameter of 5.0 mm and an inner diameter of 4.4 mm and each having a triple-bridge hollow forming cross section were formed so as to be staggered at an inter-hole pitch of 8 mm.

A water tank was disposed such that the surface of cooling water therein was positioned 20 cm below the nozzle surface of the nozzle for extruding the melted resin. The temperature of the water was set to 12° C. A pair of take-up conveyors were disposed in the water tank so as to be partially exposed from the surface of the water. Each of the take-up conveyors had an endless net made of stainless steel and having a width of 20 cm and was disposed such that the width direction of the nozzle surface and the conveyor were parallel to each other. The opening width of the endless net was set to 30 mm. In order to form side surface portions, aluminum plates were each disposed at an angle of 90 degrees relative to the direction of the net, and water was caused to flow at a speed of 1.0 L/min, thereby forming side surface portions.

The above melted resin was extruded in the form of a filament to an opening portion of the net of the above conveyor, onto the net of the above conveyor, and to the aluminum plates as the above side surface portions, and the continuous filament was caused to flow downward so as to be curved and twisted, whereby loops were formed. Thus, while portions in contact with each other were fused together, resin having a three-dimensional network configuration was formed. While both surfaces of the resin having the three-dimensional network configuration in the melted state were held between the take-up conveyors, the resin was drawn into the cooling water at a speed of 1.22 m/min so as to be solidified. Consequently, both surfaces in the thickness direction and both surfaces in the side surface direction were flattened. Then, the resin was cut into a predetermined size and was left at rest in a space at 25° C. for 1 hour. Thereafter, heat treatment was performed with hot air at 80° C. for 20 minutes, whereby a three-dimensional network structure having a width of 100 mm was obtained. The continuous filament composing the three-dimensional network structure had a hollow cross section shape.

Example 2

A three-dimensional network structure was obtained in the same manner as in Example 1 except that: the resin B was used as a raw material; the distance from the nozzle surface to the surface of the cooling water in the water tank was set to 18 cm; and the take-up speed was set to 1.29 m/min.

Example 3

A three-dimensional network structure was obtained in the same manner as in Example 1 except that: the single-hole extrusion rate was set to 2.5 g/min; the distance from the nozzle surface to the surface of the cooling water in the water tank was set to 32 cm; and the take-up speed was set to 1.62 m/min.

Example 4

A three-dimensional network structure was obtained in the same manner as in Example 2 except that: a nozzle in which orifices each having an outer diameter of 1.0 mm and each having the shape of a round hole were formed so as to be staggered at an inter-hole pitch of 6 mm was used; the single-hole extrusion rate was set to 1.0 g/min; the distance from the nozzle surface to the surface of the cooling water in the water tank was set to 17 cm; and the take-up speed was set to 0.75 m/min. The continuous filament composing the obtained three-dimensional network structure had a round cross section shape and bad a solid cross section.

Example 5

A three-dimensional network structure was obtained in the same manner as in Example 1 except that: the spinning temperature was set to 190° C.; the distance from the nozzle surface to the surface of the cooling water in the water tank was set to 30 cm; and the take-up speed was set to 0.97 m/min.

Example 6

A three-dimensional network structure was obtained in the same manner as in Example 2 except that: the spinning temperature was set to 190° C.; the distance from the nozzle surface to the surface of the cooling water in the water tank was set to 32 cm; the take-up speed was set to 0.97 m/min; and, after spinning, heat treatment was performed with hot air at 120° C. for 20 minutes, and then heat treatment was performed with hot air at 80° C. for 20 minutes.

Example 7

A three-dimensional network structure was obtained in the same manner as in Example 6 except that: the resin C was used as a raw material; the distance from the nozzle surface to the surface of the cooling water in the water tank was set to 30 cm; and, after spinning, heat treatment was performed with hot air at 90° C. for 20 minutes, and then heat treatment was performed with hot air at 50° C. for 20 minutes.

Comparative Example 1

A three-dimensional network structure was obtained in the same manner as in Example 1 except that: the resin C was used as a raw material; the spinning temperature was set to 230° C.; the distance from the nozzle surface to the surface of the cooling water in the water tank was set to 17 cm; the take-up speed was set to 0.92 m/min; and, after spinning, heat treatment was performed with hot air at 105° C. for 20 minutes.

Comparative Example 2

A three-dimensional network structure was obtained in the same manner as in Example 5 except that: the resin C was used as a raw material; the take-up speed was set to 0.92 m/min; and, after spinning, heat treatment was performed with hot air at 90° C. for 20 minutes.

Comparative Example 3

A three-dimensional network structure was obtained in the same manner as in Example 1 except that: polybutylene succinate adipate (BioPBS (registered trademark) FD92 manufactured by PTT MCC Biochem Co., Ltd.) (written as PBSA in Table 1) was used as a raw material; the spinning temperature was set to 260° C.; the single-hole extrusion rate was set to 0.9 g/min; the distance from the nozzle surface to the surface of the cooling water in the water tank was set to 25 cm; the take-up speed was set to 0.86 m/min; and, after spinning, heat treatment was performed with hot air at 70° C. for 60 minutes.

Comparative Example 4

A three-dimensional network structure was obtained in the same manner as in Example 1 except that: polylactic acid (L130 manufactured by TotalEnergies Corbion Ltd.) (written as PLA in Table 1) was used as a raw material; the spinning temperature was set to 250° C.; the single-hole extrusion rate was set to 1.2 g/min; the distance from the nozzle surface to the surface of the cooling water in the water tank was set to 17 cm; the take-up speed was set to 2.00 m/min; and heat treatment was not performed. The three-dimensional network structure was fractured at the time of measurement of each of the 40° C. compressive residual strain and the 70° C. compressive residual strain. In addition, in measurement of the hardness under 25% compression, the three-dimensional network structure was fractured when preliminary compression was performed. Therefore, the above three physical properties were not able to be measured.

Table 1 shows production conditions and the characteristics of the obtained three-dimensional network structure in Examples from 1 to 7 and Comparative Examples from 1 to 4. In Table 1, the characteristic value is the average of the value by operations of multiple times.

TABLE 1

| | | Example 1 | Example 2 | Example 3 | Example 4 | Example 5 | Example 6 |
|---|---|---|---|---|---|---|---|
| Manufacturing condition | Spinning temperature: ° C. | 220 | 220 | 220 | 220 | 190 | 190 |
| | Single-hole extrusion rate: g/min | 1.5 | 1.5 | 2.5 | 1.0 | 1.5 | 1.5 |
| | Distance (from nozzle surface to surface of cooling water in water tank): cm | 20 | 18 | 32 | 17 | 30 | 32 |
| | Take-up speed: m/min | 1.22 | 1.29 | 1.62 | 0.75 | 0.97 | 0.97 |
| | Heat treatment step | one stage | one stage | one stage | one stage | one stage | two stages |
| | Heat treatment temperature: ° C. | 80 | 80 | 80 | 80 | 80 | 120/80 |
| | Heat treatment time: min | 20 | 20 | 20 | 20 | 20 | 20/20 |
| Resin | Resin | A | B | A | B | A | B |
| | Resin melting point: ° C. | 129 | 150 | 129 | 150 | 129 | 150 |
| | Melt flow rate: g/10 min | 18 | 19 | 18 | 19 | 18 | 19 |
| | Weight-average molecular weight: g/mol | 78000 | 76000 | 78000 | 76000 | 78000 | 76000 |
| | PBAT content: % by mass | 100 | 100 | 100 | 100 | 100 | 100 |
| | Molar ratio (terephthalic acid residue/adipic acid residue) | 1.00 | 1.50 | 1.00 | 1.50 | 1.00 | 1.50 |
| Three-dimensional network structure | Average fiber diameter: mm | 0.84 | 0.75 | 0.73 | 0.53 | 0.81 | 0.73 |
| | Hollow rate: % | 13.8 | 7.5 | 17.8 | 0.0 | 21.6 | 22.5 |
| | Apparent density: g/cm$^3$ | 0.036 | 0.037 | 0.044 | 0.042 | 0.054 | 0.050 |
| | Thickness: mm | 29.4 | 27.2 | 28 | 27.4 | 24.6 | 27.2 |
| | Melting point: ° C. | 127.3 | 148.2 | 127.9 | 148.3 | 126.9 | 147.8 |
| | Melting-start onset temperature: ° C. | 86.2 | 117.5 | 84.5 | 114.9 | 85.9 | 117.6 |
| | Melting enthalpy: J/g | 21.5 | 25.2 | 19.6 | 29.6 | 21.6 | 27.5 |
| | Low-temperature phase onset temperature: ° C. | 34.9 | 33.8 | 35.3 | 33.5 | 39.6 | 32.9 |
| | Low-temperature phase enthalpy: J/g | 2.2 | 1.0 | 1.8 | 1.0 | 0.9 | 1.8 |
| | 40° C. compressive residual strain: % | 16.2 | 15.3 | 16.9 | 15.3 | 12.8 | 12.1 |
| | 70° C. compressive residual strain: % | 23.5 | 26.6 | 22.5 | 21.3 | 20.4 | 22.0 |
| | Hardness under 25% compression: N/φ50 mm | 4.9 | 6.4 | 7.3 | 3.7 | 12.7 | 24.6 |

| | | Example 7 | Comparative Example 1 | Comparative Example 2 | Comparative Example 3 | Comparative Example 4 |
|---|---|---|---|---|---|---|
| Manufacturing condition | Spinning temperature: ° C. | 190 | 230 | 190 | 260 | 250 |
| | Single-hole extrusion rate: g/min | 1.5 | 1.5 | 1.5 | 0.9 | 1.2 |
| | Distance (from nozzle surface to surface of cooling water in water tank): cm | 30 | 17 | 30 | 25 | 17 |
| | Take-up speed: m/min | 0.97 | 0.92 | 0.92 | 0.86 | 2.00 |
| | Heat treatment step | two stages | one stage | one stage | one stage | — |

TABLE 1-continued

| | | | | | | |
|---|---|---|---|---|---|---|
| | Heat treatment temperature: ° C. | 90/50 | 105 | 90 | 70 | — |
| | Heat treatment time: min | 20/20 | 20 | 20 | 60 | — |
| Resin | Resin | C | C | C | PBSA | PLA |
| | Resin melting point: ° C. | 123 | 123 | 123 | 84 | 175 |
| | Melt flow rate: g/10 min | 20 | 20 | 20 | 4 | 10 |
| | Weight-average molecular weight: g/mol | 78000 | 78000 | 78000 | — | — |
| | PBAT content: % by mass | 100 | 100 | 100 | 0 | 0 |
| | Molar ratio (terephthalic acid residue/adipic acid residue) | 0.89 | 0.89 | 0.89 | — | — |
| Three-dimensional network structure | Average fiber diameter: mm | 0.77 | 0.72 | 0.72 | 0.71 | 0.32 |
| | Hollow rate: % | 28.1 | 2.8 | 17.4 | 0.0 | 42.0 |
| | Apparent density: g/cm³ | 0.042 | 0.060 | 0.051 | 0.062 | 0.035 |
| | Thickness: mm | 25.8 | 23.4 | 26.3 | 27.5 | 34.1 |
| | Melting point: ° C. | 121.5 | 114.0 | 101.9 | 86.4 | 174.4 |
| | Melting-start onset temperature: ° C. | 90.4 | 106.6 | 94.6 | 75.7 | 168.7 |
| | Melting enthalpy: J/g | 20.2 | 16.0 | 21.3 | 42.5 | 48.0 |
| | Low-temperature phase onset temperature: ° C. | 41.1 | 40.2 | 36.1 | 48.6 | — |
| | Low-temperature phase enthalpy: J/g | 0.5 | 2.7 | 3.0 | 6.6 | — |
| | 40° C. compressive residual strain: % | 16.3 | 18.3 | 18.8 | 19.9 | not measurable |
| | 70° C. compressive residual strain: % | 18.8 | 28.2 | 22.6 | 20.4 | not measurable |
| | Hardness under 25% compression: N/φ50 mm | 3.8 | 5.4 | 8.1 | 20.6 | not measurable |

The invention claimed is:

1. A three-dimensional network structure having a three-dimensional random loop-bonded configuration and comprising a continuous filament made from a thermoplastic resin composition, wherein the thermoplastic resin composition contains 70% by mass or higher of a polybutylene adipate terephthalate resin, and an enthalpy of an endothermic peak in which a differential scanning calorimetry curve regarding the continuous filament measured by using a differential scanning calorimeter has a minimum value in a range from 30° C. to 70° C. of 2.5 J/g or lower.

2. The three-dimensional network structure according to claim 1, wherein the polybutylene adipate terephthalate resin contains an adipic acid unit and a terephthalic acid unit, and a molar ratio of the terephthalic acid unit to the adipic acid unit is 1.0 or higher and 3.0 or lower.

3. The three-dimensional network structure according to claim 2, wherein the three-dimensional network structure has a 40° C. compressive residual strain of 25% or lower.

4. The three-dimensional network structure according to claim 2, wherein the three-dimensional network structure has a 40° C. compressive residual strain of 15% or lower and a 70° C. compressive residual strain of 30% or lower.

5. The three-dimensional network structure according to claim 1, wherein the polybutylene adipate terephthalate resin has a melting point of 120° C. or higher and 180° C. or lower.

6. The three-dimensional network structure according to claim 1, wherein the three-dimensional network structure has a 40° C. compressive residual strain of 25% or lower.

7. The three-dimensional network structure according to claim 1, wherein the three-dimensional network structure has a 40° C. compressive residual strain of 15% or lower and a 70° C. compressive residual strain of 30% or lower.

8. A method for manufacturing the three-dimensional network structure according to claim 1, the method comprising:

an extrusion step of extruding, from a nozzle, the thermoplastic resin composition in a melted condition to form the continuous filament;

a molding step of molding the continuous filament extruded from the nozzle, into a three-dimensional network configuration so as to obtain a molded body; and a heat treatment step of heat treating the molded body, wherein the heat treatment step includes two stages, a first stage of the heat treatment step includes heat treating the continuous filament at a temperature not higher than a melting point of the continuous filament, and a second stage of the heat treatment step includes heat treating the continuous filament at a temperature lower than the temperature of the heat treating in the first stage of the heat treatment step.

9. The method for manufacturing the three-dimensional network structure, according to claim 8, wherein the thermoplastic resin composition contains a polybutylene adipate terephthalate resin having a melting point of 120° C. or higher and 180° C. or lower.

* * * * *